US012767177B2

(12) United States Patent
Stein et al.

(10) Patent No.: US 12,767,177 B2
(45) Date of Patent: Oct. 20, 2026

(54) SYSTEM AND METHOD FOR MANAGING A TIRE FIRE

(71) Applicant: Torc Robotics, Inc., Blacksburg, VA (US)

(72) Inventors: Fridtjof Stein, Ostfildern (DE); Florian Kuehnle, Baden-Württemberg (DE); Frank Hannemann, Nuertingen (DE)

(73) Assignee: Torc Robotics, Inc., Blacksburg, VA (US)

( * ) Notice: Subject to any disclaimer, the term of this patent is extended or adjusted under 35 U.S.C. 154(b) by 12 days.

(21) Appl. No.: 19/086,680

(22) Filed: Mar. 21, 2025

(65) Prior Publication Data

US 2025/0388235 A1 Dec. 25, 2025

(51) Int. Cl.
*B60W 60/00* (2020.01)
*A62C 3/07* (2006.01)

(52) U.S. Cl.
CPC ........... *B60W 60/0016* (2020.02); *A62C 3/07* (2013.01); *B60W 2520/28* (2013.01); *B60W 2530/20* (2013.01); *B60W 2756/10* (2020.02)

(58) Field of Classification Search
CPC ......... B60W 60/0016; B60W 2520/28; B60W 2530/20; B60W 2756/10; A62C 3/07; B60C 23/00; B60K 28/10
See application file for complete search history.

(56) References Cited

U.S. PATENT DOCUMENTS 9,783,012 B2 10/2017 Taki
10,035,387 B2 * 7/2018 Carresjö ............. B60C 23/0474
11,065,920 B2 7/2021 Kanbayashi et al.
11,263,830 B2 3/2022 Liu et al.
2013/0278771 A1 * 10/2013 Magoun ................ B60C 11/246 348/148
(Continued)

FOREIGN PATENT DOCUMENTS

CN 103863026 A 6/2014
CN 105252973 A 1/2016
(Continued)

OTHER PUBLICATIONS

The Mighty Trucker, Watch: Self-driving truck responds to tire blowout. Press Release. retrieved online at: https://themightytrucker.com/self-driving-truck-responds-to-tire-blowout/. 18 pages, (2024).
(Continued)

*Primary Examiner* — Stephanie T Su
(74) *Attorney, Agent, or Firm* — McCarter & English, LLP

(57) ABSTRACT

The present disclosure relates to a method for controlling an autonomously driving vehicle, in particular a commercial vehicle, in which the wheels of the vehicle are monitored. Upon detection of a safety-critical condition of the wheels, the driving behavior of the vehicle is automatically adjusted. In a method in which the vehicle is secured in the event of a tire fire, a fire alarm is sent to an emergency call center external to the vehicle upon identification of a burning tire, and the vehicle changes from the current lane to a shoulder on which the speed is reduced to wear off the burning tire. After the burning tire has been removed from the vehicle, the vehicle is brought to a stop at a safe distance from the burning tire.

20 Claims, 5 Drawing Sheets

(56) References Cited

U.S. PATENT DOCUMENTS

| | | | | |
|---|---|---|---|---|
| 2021/0049445 | A1 | 2/2021 | Bielby et al. | |
| 2021/0125428 | A1* | 4/2021 | Tedesco | B60C 23/20 |
| 2023/0356551 | A1* | 11/2023 | Poorsartep | B60C 23/009 |
| 2024/0326869 | A1* | 10/2024 | Carroll | B60W 30/085 |

FOREIGN PATENT DOCUMENTS

| | | | |
|---|---|---|---|
| CN | 105787618 | A | 7/2016 |
| DE | 102021005520 | A1 | 12/2021 |
| JP | 2019001342 | A | 1/2019 |
| JP | 2021059280 | A | 4/2021 |

OTHER PUBLICATIONS

Wieck, Tacs Tire Anomaly and Classification System—Experience in select States. International Road Dynamics Inc. Nov. 18, 2018;19 pages.

* cited by examiner

SYSTEM AND METHOD FOR MANAGING A TIRE FIRE

CROSS-REFERENCE TO RELATED APPLICATIONS

The present application claims priority to German Patent Application No. 102024117865.5 filed on Jun. 25, 2024, and titled "METHOD AND DEVICE FOR CONTROLLING AN AUTONOMOUSLY DRIVING VEHICLE, IN PARTICULAR A COMMERCIAL VEHICLE", which is hereby incorporated by reference in its entirety.

TECHNICAL FIELD

The present disclosure relates to a method for controlling an autonomous vehicle. In particular, the present disclosure relates to monitoring the wheels of the vehicle and, upon detection of a safety-critical condition of the wheels, the driving behavior of the vehicle is automatically adjusted. The present disclosure further relates to a device for carrying out the method.

BACKGROUND

In the future, autonomously driving vehicles are expected on the roads, whose driving behavior will be taken over by a virtual driver who must perform all the activities of a human driver. But there are also emergency situations in which a human driver has clear instructions on what to do. These are also mandatory for a virtual driver. This means that other road users must not be endangered and the vehicle, including its cargo, must not be endangered as far as possible.

A method for dynamically recording tire and wheel properties to detect tire detachments and other defects on the tire beneath the tire surface is known from US 2021/0125428 A1.

US 2021/0049445 A discloses a method for measuring operating parameters of the tire and wheel assemblies of a vehicle. To minimize risks in the event of a flat tire, the speed of the vehicle is reduced.

A vehicle chassis according to CN 105252973 A is equipped with a thermal infrared camera. The infrared camera determines a tire temperature of the vehicle.

U.S. Pat. No. 11,263,830 B2 describes a system for intervening in an operation of one or more autonomous driving functions of a vehicle.

A system which considers the falling off of a tire from a wheel is known from JP 2021/059280 A. While avoiding excessive stress on the affected wheel, the vehicle is moved to a safe location.

BRIEF DESCRIPTION

It is an object according to the present disclosure to provide a method and a device for controlling an autonomously driving vehicle, which device secures the vehicle in the event of a tire fire.

In an aspect of the present disclosure, a method for controlling an autonomously driving vehicle is disclosed. The method comprises monitoring the wheels of the vehicle and automatically adjusting the driving behavior of the vehicle when a safety-critical condition of the wheels is detected. The method further comprises sending a fire alarm to an emergency center external to the vehicle when a burning tire is identified and changing the vehicle from the current lane to a shoulder on which the speed is reduced to wear off the burning tire. After the burning tire has been removed from the vehicle, the vehicle is brought to a stop at a safe distance from the burning tire. By detecting a tire fire in good time and automatically taking appropriate measures, the fire can be largely prevented from spreading to the entire vehicle and its cargo, and damage can be reduced. Other road users are protected as well.

Another aspect according to the present disclosure relates to a device for controlling an autonomous vehicle including at least one sensor for determining a tire condition, wherein the sensor is connected to a control unit for automatically adjusting the driving behavior of the vehicle upon detection of a safety-critical condition of the tire. In the event of a tire fire, the vehicle and its cargo are secured because the control unit is configured to carry out the procedure according to the features described.

Advantageously, the sensor is configured as an LWIR camera for detecting tire temperature. The LWIR camera is a long-wave infrared camera that is used as a temperature detection device and uses the color environment of the tire to determine whether the tire is at an elevated temperature or whether there is a possible tire fire.

In some embodiments, a temperature sensor for detecting the tire temperature is arranged in each tire of the vehicle, which sensor communicates wirelessly with the control unit. The control unit compares the temperature signals transmitted by the temperature sensors with temperature threshold values to detect a hazardous situation.

In some embodiments, each tire is associated with a wheel speed sensor and/or a tire pressure sensor, which sensors are coupled to the control unit. Using signals from these sensors which are positioned on all wheels or tires, the control unit can determine at an early stage that a tire is at risk if its signals differ from those of other tires.

In some embodiments, the control unit has a module for triggering an emergency program upon detection of a burning tire, wherein module is connected to a planning module for setting an emergency driving behavior of the vehicle, which controls the vehicle actuators. The fire protection strategy, which is triggered in the event of a tire fire, is simply installed as a software in the vehicle.

BRIEF DESCRIPTION OF DRAWINGS

Further advantages, features, and details will be apparent from the following description, in which at least one exemplary embodiment is described in detail, with reference to the drawings where appropriate. Features described and/or illustrated may form the subject matter according to the present disclosure alone or in any meaningful combination, possibly also independently of the claims, and may in particular also be the subject matter of one or more separate applications. The same, similar, and/or functionally identical parts are provided with the same reference numerals.

DETAILED DESCRIPTION

Figure 1:
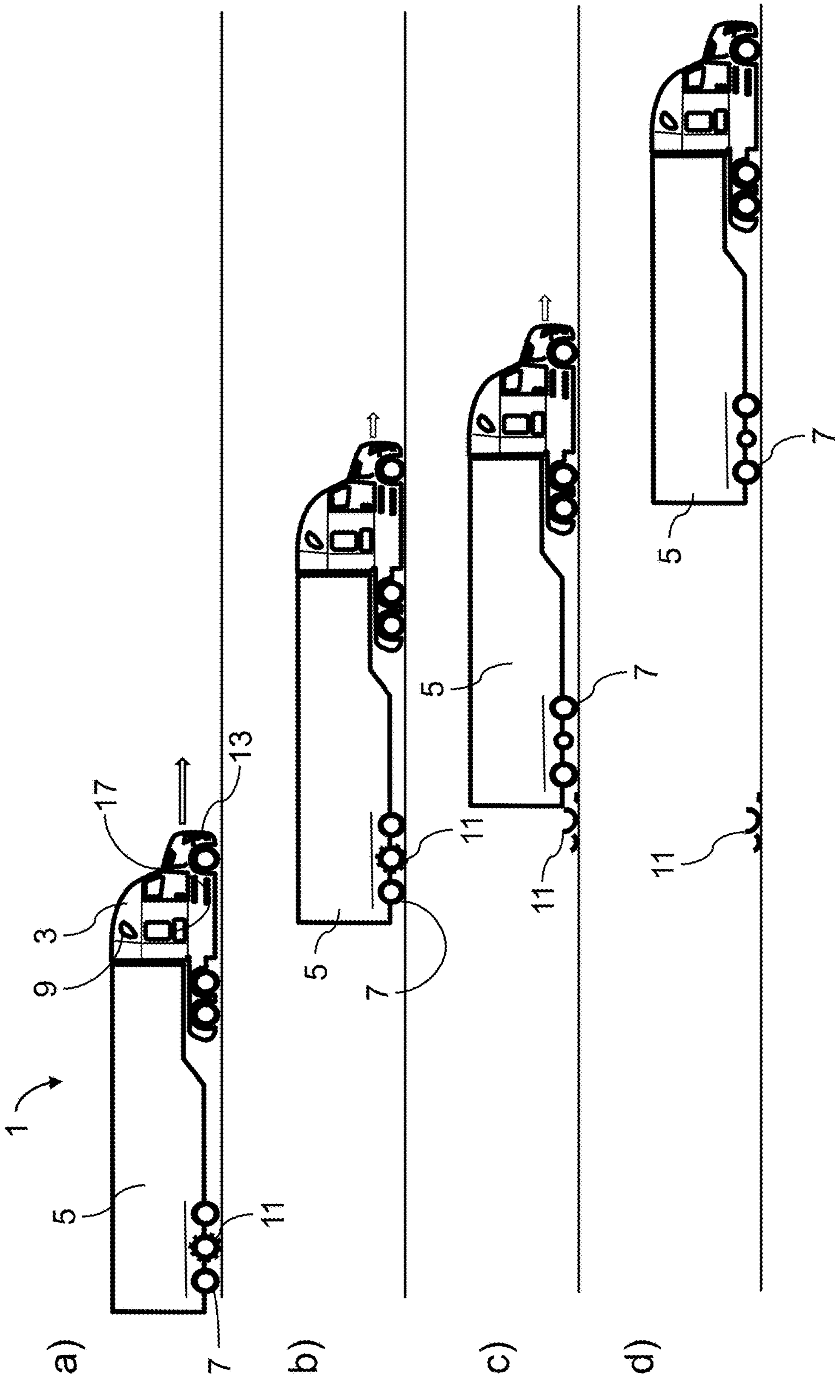
FIG. 1 is separated into four schematics and shows an exemplary embodiment of a method according to the present disclosure.

FIG. 1 shows an exemplary embodiment of a method according to the present disclosure using the example of an autonomously driving vehicle. For ease of explanation of the method, FIG. 1 is separated into four schematics, and identified as "a", "b", "c", and "d". In this case, the autonomously driving vehicle is a semi-trailer truck 1 which consists of a tractor vehicle 3 and a semi-trailer 5. However, the present disclosure is not limited to the semi-trailer truck 1, but can be used in all autonomously driving vehicles that drive with a trailer. These can be commercial vehicles, but also buses or passenger cars.

Referring to the semi-trailer truck 1, the tires 7 of the semi-trailer 5 are monitored by a temperature measuring device 9. If a burning tire 11 is detected (as shown in schematic a of FIG. 1), the hazard warning lights 13 are automatically switched on and a fire alarm is output to a vehicle backend 41. The semi-trailer truck 1 is automatically steered from its lane onto the hard shoulder of the road. On this hard shoulder, the vehicle speed is automatically reduced (as shown in schematic b of FIG. 1). The semi-trailer truck 1 continues to drive on the hard shoulder at reduced speed until the burning tire 11 has worn off (as shown in schematic c of FIG. 1). The semi-trailer truck 1 is then brought to a stop at a safe distance from the burning tire 11, as shown in schematic d of FIG. 1, and waits for the fire department.

Figure 2:
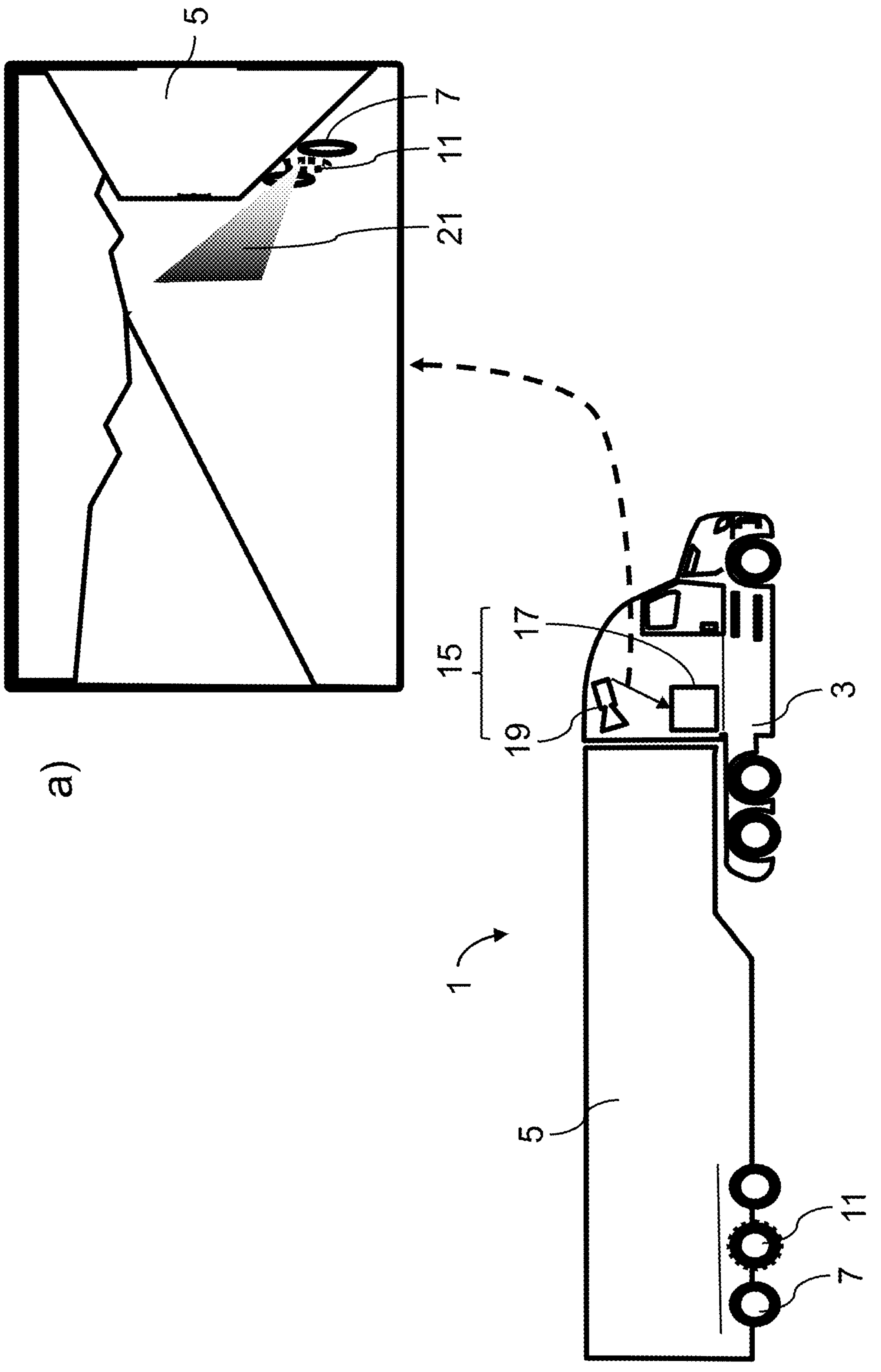
FIG. 2 shows a first exemplary embodiment of a device, and a detailed portion of the device, according to the present disclosure.

FIG. 2 shows a first exemplary embodiment of a device according to the present disclosure. FIG. 2 includes a detailed schematic of the semi-trailer truck 1 and is identified as "a". The device 15 is positioned in the tractor vehicle 3 and comprises a control unit 17 which is connected to a long-wave infrared camera 19 (LWIR camera) arranged on the outside of the tractor vehicle 3 for monitoring a temperature in the environment of the vehicle tires 7. As can be seen in schematic a of FIG. 2, the burning tire 11 emits smoke 21 into the vehicle environment, the temperature of which is measured by the long-wave infrared camera 19 and output to the control unit 17. The control unit 17 compares the measured temperature with a temperature threshold value and automatically initiates the described emergency measures if the temperature threshold value is exceeded.

Figure 3:
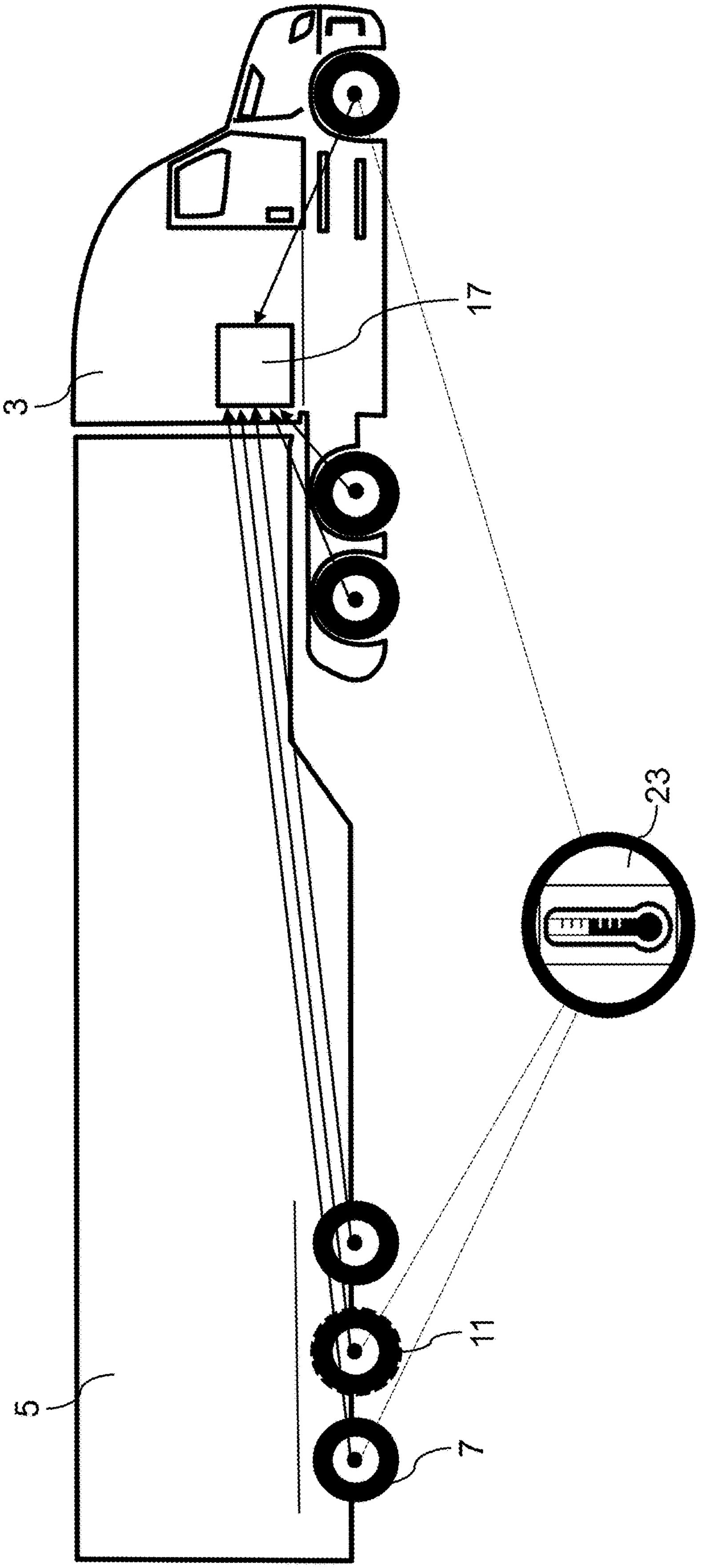
FIG. 3 shows another exemplary embodiment of a device according to the present disclosure.

Another exemplary embodiment of the device according to the present disclosure is shown in FIG. 3. Instead of the LWIR camera 19, a temperature sensor 23 is integrated in each tire 7, which sensor communicates wirelessly with the control unit 17. If the temperature transmitted by the temperature sensor 23 of the burning tire 11 is higher than the temperatures transmitted by the temperature sensors 23 of the other tires, the control unit 17 concludes that there is a tire fire and initiates the emergency measures described.

Figure 4:
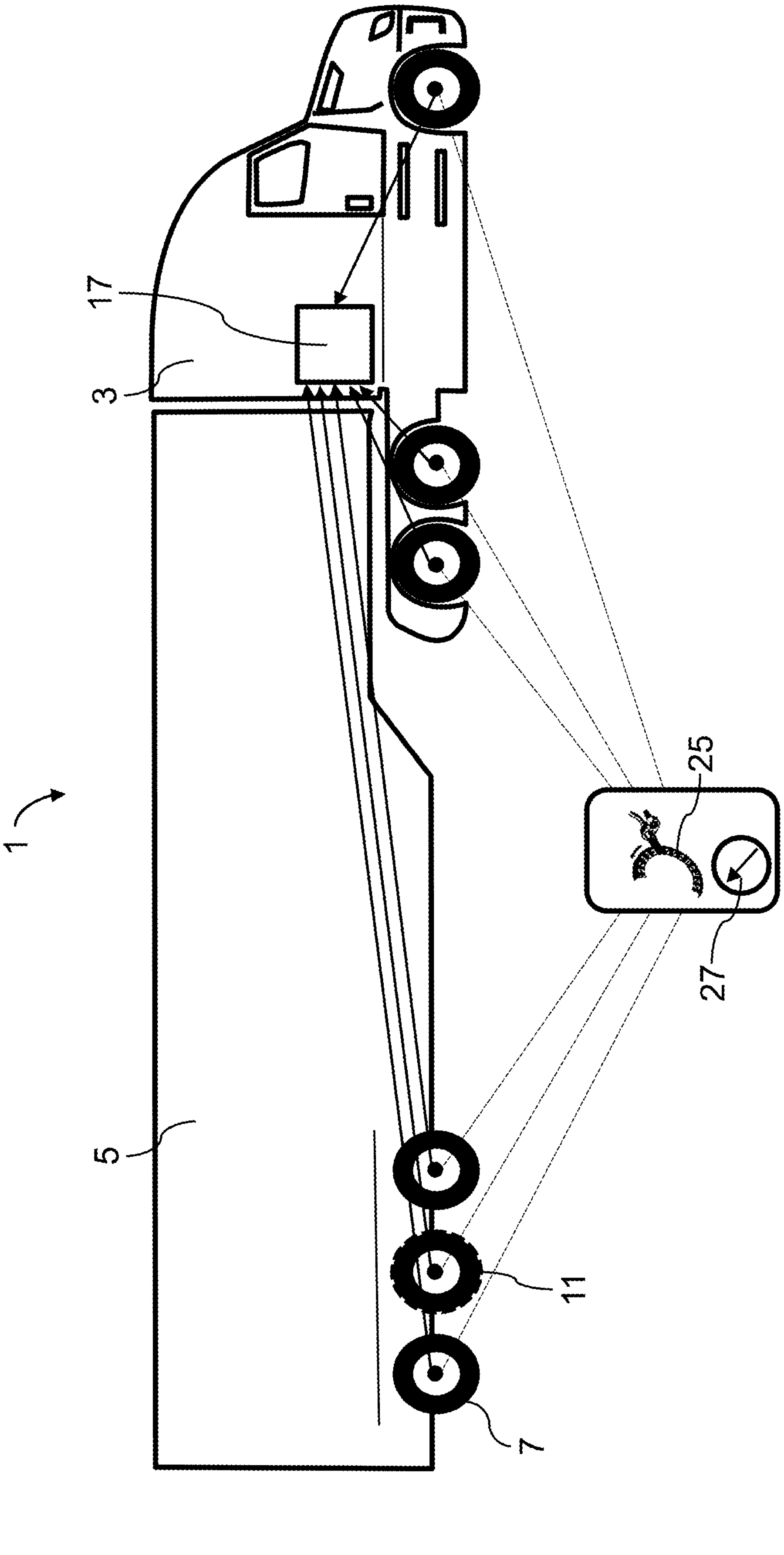
FIG. 4 shows another exemplary embodiment of a device according to the present disclosure.

In addition to the temperature measuring devices 19, 23 shown in FIGS. 2 and 3, a wheel speed sensor 25 and a tire pressure sensor 27 are positioned on each wheel or in each tire according to FIG. 4, which sensors are also wirelessly connected to the control unit 17. The signals transmitted by the wheel speed sensors 25 and the tire pressure sensors 27 serve the control unit 17 as warning signals for a possibly imminent tire fire.

Figure 5:
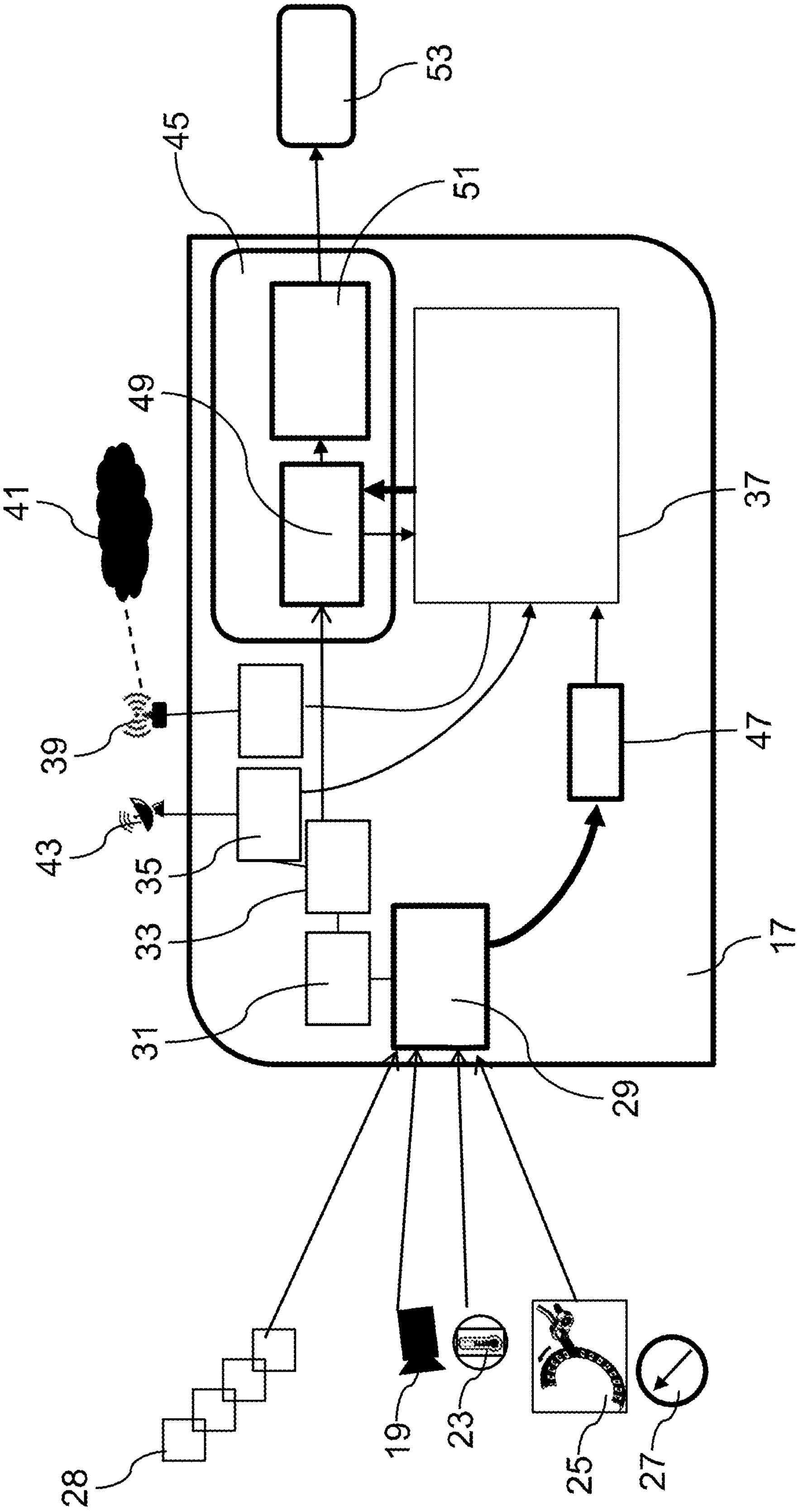
FIG. 5 shows an exemplary embodiment of a control unit.

FIG. 5 shows an exemplary embodiment of the control unit 17, which comprises a sensor data processing module 29 which forwards a plurality of sensor data output by the LWIR camera 19 and/or the temperature sensors 23, the wheel speed sensors 25, and the tire pressure sensors 27 and other sensors 28 to a fusion module 31. The data summarized in the fusion module 31 is associated in a detection module 33 to data from an internal map 35 connected to a GPS unit 43 and passed on to a planning module 45 for determining a vehicle behavior. The sensor data detected in the sensor data processing module 29 is simultaneously output to a wheel fire and smoke detection module 47 to determine whether one of the wheels 7 of the semi-trailer 5 has caught fire. Reasons for a wheel to catch fire include a defective wheel bearing or baked-on brake pads or leakage of a flammable liquid or insufficient tire pressure. In the wheel fire and smoke detection module 47, the temperatures output by the temperature measuring devices 9 are compared either with a temperature threshold value or with each other. If the threshold value is exceeded by a temperature signal and/or if a temperature signal exceeds the temperature signals of the other tires 7, it is assumed that the tire 11 with the increased temperature signal has caught fire. This information is output to the fire behavior module 37 of the control unit 17, which starts an emergency program and outputs corresponding commands to a situation analysis module 49 of the planning module 35, which is connected to a trajectory generation module 51 for creating a driving trajectory of the semi-trailer 1 from the lane to the hard shoulder and for reducing the driving speed. For this purpose, corresponding signals are output from the planning module 35 to vehicle actuators 53, such as brakes, engine, and steering.

The fire behavior module 37 is connected to a transceiver unit 39 to request the fire department, which forwards a message to the emergency call center 41.

The solution described is not only suitable for autonomously driving vehicles, but can also be offered to a driver of a vehicle with a trailer to provide support in the event of a burning tire.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

The invention claimed is:

1. A method for controlling an autonomous vehicle, the autonomous vehicle including a number of tires rotatably mounted thereto, the method comprising:

monitoring the number of tires of the vehicle;

adjusting a driving behavior of the vehicle upon detection of a safety-critical condition of one of the number of tires;

sending, upon identification that one of the number of tires is a burning tire, a fire alarm to an emergency call center external to the vehicle;

steering the vehicle from the current lane to a shoulder on which a speed of the vehicle is reduced to separate the burning tire from the vehicle; and bringing the vehicle to a stop a distance from the burning tire after the burning tire has been separated from the vehicle.

2. The method of claim 1, the method further comprising detecting a temperature of at least one of the number of tires using at least one temperature measuring device mounted with respect to the at least one of the number of tires.

3. The method of claim 2, wherein the temperature measuring device is either a long-wave infrared camera (LWIR) or a temperature sensor.

4. The method of claim 2, the method further comprising identifying the burning tire by comparing a measured temperature of the tire with a threshold temperature.

5. The method of claim 2, the method further comprising identifying the burning tire by comparing a first measured temperature of the tire with a second measured temperature of at least one of the number tires.

6. The method of claim 1, the method further comprising detecting a tire pressure of at least one of the number of tires.

7. The method of claim 1, the method further comprising detecting a wheel speed of at least one of the number of tires.

8. The method of claim 1, the method further comprising setting an emergency driving behavior of the vehicle using a planning module of the vehicle.

9. The method of claim 8, the method further comprising controlling, via the emergency driving behavior, a number of actuators of the vehicle.

10. The method according to claim 1, wherein the vehicle further comprises a trailer which comprises a portion of the number of tires rotatably mounted thereto, and wherein the burning tire is one of the portion of the number of tires mounted with respect to the trailer.

11. A device for controlling an autonomous vehicle comprising a number of tires and at least one sensor configured to determine a tire condition, wherein the at least one sensor is connected to a control unit for automatically adjusting a driving behavior of the vehicle upon detection of a safety-critical condition of at least one of the number of tires, and wherein the control unit is configured to:

monitor the number of tires, adjust the driving behavior of the vehicle upon detection of a safety-critical condition of the at least one of the number of tires, send, upon identification that at least one of the number of tires is a burning tire, a fire alarm to an emergency call center external to the vehicle;

steer the vehicle from the current lane to a shoulder on which a speed of the vehicle is reduced to separate the burning tire from the vehicle; and bring the vehicle to a stop a distance from the burning tire after the burning tire has been separated from the vehicle.

12. The device according to claim 11, wherein the at least one sensor is configured as a long-wave infrared (LWIR) camera configured to detect a temperature of at least one of the number of tires.

13. The device according to claim 12, wherein a wheel speed sensor and/or a tire pressure sensor is mounted with respect to each tire of the number of tires and the wheel speed sensor and/or the tire pressure sensor are coupled to the control unit.

14. The device according to claim 11, wherein a temperature sensor is mounted with respect to each tire of the number of tires, and the temperature sensor is configured to detect a temperature of the corresponding tire of the vehicle, and wherein each temperature sensor communicates wirelessly with the control unit.

15. The device according to claim 14, wherein a wheel speed sensor and/or a tire pressure sensor is mounted with respect to each tire of the number of tires, and the wheel speed sensor and/or the tire pressure sensor are coupled to the control unit.

16. The device according to claim 11, wherein the control unit comprises a module configured to trigger an emergency program upon detection of the burning tire, wherein the module is connected to a planning module configured to set an emergency driving behavior of the vehicle, and wherein the emergency driving behavior controls a number of actuators of the vehicle.

17. The device according to claim 16, wherein the control module is configured to detect the burning tire via a temperature measuring device.

18. The device according to claim 11, wherein each tire comprises a wheel speed sensor coupled with the control unit.

19. The device according to claim 11, wherein each tire comprises a tire pressure sensor coupled to the control unit.

20. The device according to claim 11, wherein the vehicle further comprises a trailer which comprises a portion of the number of tires rotatably mounted thereto, and wherein the burning tire is one of the portion of the number of tires mounted with respect to the trailer.

* * * * *